United States Patent
Merriman et al.

(10) Patent No.: US 7,673,178 B2
(45) Date of Patent: Mar. 2, 2010

(54) BREAK AND OPTIONAL HOLD ON FAILURE

(75) Inventors: Loren Merriman, Duvall, WA (US);
Gordon Hardy, Seattle, WA (US);
Curtis Anderson, Kent, WA (US);
Michael Robinson, Bellevue, WA (US);
Dipak Boyed, Bellevue, WA (US);
Christopher Callahan, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 465 days.

(21) Appl. No.: 11/701,122

(22) Filed: Jan. 31, 2007

(65) Prior Publication Data
US 2008/0184075 A1    Jul. 31, 2008

(51) Int. Cl.
*G06F 11/00* (2006.01)
(52) U.S. Cl. .................................. 714/35; 714/38
(58) Field of Classification Search ............... 714/35, 714/38, 49; 717/124, 129
See application file for complete search history.

(56) References Cited
U.S. PATENT DOCUMENTS

| | | | | |
|---|---|---|---|---|
| 4,183,459 | A * | 1/1980 | Donn et al. .................... 714/49 |
| 5,269,014 | A | 12/1993 | Ogino .......................... 395/500 |
| 5,548,718 | A | 8/1996 | Siegel et al. ............. 395/183.14 |
| 5,703,788 | A | 12/1997 | Shei et al. ..................... 364/488 |
| 6,038,378 | A | 3/2000 | Kita et al. ............... 395/183.14 |
| 6,243,838 | B1 | 6/2001 | Liu et al. ....................... 714/57 |
| 6,408,403 | B1 | 6/2002 | Rodrigues et al. ............. 714/38 |
| 6,412,081 | B1 * | 6/2002 | Koscal et al. .................. 714/34 |
| 6,484,274 | B1 * | 11/2002 | Lee et al. ...................... 714/38 |
| 6,513,154 | B1 | 1/2003 | Porterfield ................... 717/101 |
| 6,519,730 | B1 | 2/2003 | Ando et al. ................... 714/746 |
| 6,523,139 | B1 | 2/2003 | Banning et al. ................ 714/43 |
| 6,557,120 | B1 | 4/2003 | Nicholson et al. ............. 714/38 |
| 6,665,824 | B1 | 12/2003 | Ruhlen et al. .................. 714/57 |
| 6,681,280 | B1 * | 1/2004 | Miyake et al. ............... 710/261 |
| 6,691,250 | B1 | 2/2004 | Chandiramani et al. ........ 714/25 |
| 6,742,141 | B1 | 5/2004 | Miller .......................... 714/26 |

(Continued)

FOREIGN PATENT DOCUMENTS

EP    1 420 344 A2    5/2004

OTHER PUBLICATIONS

Zeller, Isolating cause-effect chains from computer programs http://portal.acm.org/citation.cfm?id=587053&coll=ACM&dl=ACM&CFID=75919783&CFTOKEN=92791909 Nov. 18-22, 2002, pp. 1-10.

(Continued)

*Primary Examiner*—Marc Duncan
(74) *Attorney, Agent, or Firm*—Merchant & Gould, P.C.

(57) ABSTRACT

Break and optional hold preserves a state of a computing environment on which a software program has failed. Being able to examine the status of the environment existing upon the occurrence of the failure, including the condition of various processes and values facilitates resolution of the cause of the failure. Upon occurrence of a failure during the execution of a first software program in a first computing environment, execution of the first software program breaks. A first state of the first computing environment existing upon the breaking in execution of the first software program is then held. A failure notification is generated to signal the failure to a monitoring system. The monitoring system accesses hold information to determine whether the first computing environment should hold its current state and whether one or more other computing environments interacting with the first computing environment should also hold their states.

19 Claims, 6 Drawing Sheets

U.S. PATENT DOCUMENTS

| | | | |
|---|---|---|---|
| 6,823,478 B1 * | 11/2004 | Prologo et al. ................. | 714/38 |
| 6,874,099 B1 | 3/2005 | Balasubramanian et al. ... | 714/4 |
| 6,915,455 B2 * | 7/2005 | Jones et al. .................... | 714/38 |
| 6,922,796 B1 * | 7/2005 | Matena et al. ................. | 714/48 |
| 7,000,154 B1 | 2/2006 | LeDuc et al. ................. | 714/47 |
| 7,024,592 B1 | 4/2006 | Voas et al. .................... | 714/47 |
| 7,058,857 B2 | 6/2006 | Dallin ........................ | 714/38 |
| 7,058,927 B2 | 6/2006 | Yenne et al. ................. | 717/128 |
| 7,080,287 B2 | 7/2006 | Salem ......................... | 714/38 |
| 7,096,388 B2 | 8/2006 | Singh et al. ................... | 714/38 |
| 7,099,797 B1 | 8/2006 | Richard ...................... | 702/182 |
| 7,168,008 B2 * | 1/2007 | de Bonet ..................... | 714/38 |
| 7,490,268 B2 * | 2/2009 | Keromytis et al. ............ | 714/38 |
| 2003/0028856 A1 | 2/2003 | Apuzzo et al. .............. | 717/124 |
| 2003/0200483 A1 * | 10/2003 | Sutton ......................... | 714/25 |
| 2004/0060044 A1 | 3/2004 | Das et al. .................... | 717/171 |
| 2004/0078686 A1 * | 4/2004 | Toyooka et al. .............. | 714/38 |
| 2004/0139374 A1 | 7/2004 | Meaney et al. ................ | 714/48 |
| 2004/0194063 A1 | 9/2004 | Pereira ....................... | 717/124 |
| 2005/0081118 A1 | 4/2005 | Cheston et al. ............... | 714/47 |
| 2005/0086644 A1 * | 4/2005 | Chkodrov et al. ........... | 717/124 |
| 2005/0125788 A1 * | 6/2005 | Lupini et al. ................ | 717/174 |
| 2005/0188269 A1 | 8/2005 | El-Shimi et al. ............. | 714/38 |
| 2005/0262472 A1 | 11/2005 | Wood et al. .................. | 717/102 |
| 2006/0005078 A1 * | 1/2006 | Guo et al. ..................... | 714/38 |
| 2006/0020858 A1 * | 1/2006 | Schaefer ...................... | 714/38 |
| 2006/0150008 A1 | 7/2006 | Srinivas et al. ............... | 714/12 |
| 2006/0190770 A1 | 8/2006 | Harding ...................... | 714/38 |
| 2007/0245313 A1 | 10/2007 | Hardy et al. ................. | 714/124 |
| 2008/0098264 A1 * | 4/2008 | Day et al. ..................... | 714/38 |
| 2008/0184079 A1 | 7/2008 | Merriman et al. ............ | 714/48 |

OTHER PUBLICATIONS

Orso et al., Testing and debugging: Isolating relevant component interactions with JINSI http://portal.acm.org/citation.cfm?id=1138915&coll=ACM&dl=ACM&CFID=75919783&CFTOKEN=92791909 May 23, 2006, pp. 3-9.

Antonia Bertolino et al., "Assessing the risk due to software faults: estimates of failure rate versus evidence of perfection," Received: May 7, 1998; Revised: Sep. 2, 1998; Accepted: Sep. 5, 1998, Wiley InterScience: Journal: Abstract, Internet site, 2 pages.

Feng-Zhong Zou, "A change-point perspective on the software failure process," Received Aug. 14, 2002; Revised: Mar. 6, 2003, Wiley InterScience: Journal: Abstract, Internet site, 2 pages.

Mehmet Sahinoglu et al., "Alternative Parameter Estimation Methods for the Compound Poisson Software Reliability Model with Clustered Failure Data," Received: Apr. 24, 1994; Revised: Dec. 28, 1995, Wiley InterScience: Journal: Abstract, Internet site, 2 pages.

John Donovan et al., "Total System Reliability: Integrated Model for Growth and Test Termination," Received: Jul. 20, 2003; Revised: Jan. 22, 2004, Wiley InterScience: Journal: Abstract, Internet site, 2 pages.

U.S. Appl. No. 11/404,679, filed Apr. 14, 2006 entitled "Failure Tagging".

U.S. Appl. No. 11/700,992, filed Jan. 31, 2007 entitled "Tracking Down Elusive Intermittent Failures".

Software Defect Isolation; http://tejasconsulting.com/papers/iworks98/defect_isol.pdf; Presented at the High-Performance Computing Users Group, Mar. 1998 and Interworks, Apr. 1998.

Finding the root cause of application problems is difficult and time consuming; http://www.radview.com/Products/RCA-WebLOAD-AnalyzerOverview.aspx; Last accessed Apr. 4, 2007.

Finding Failure Causes through Automated Testing; http://www.irisa.fr/lande/ducasse/aadebug2000/proceedings/05zeller.ps.gz; Last accessed Jul. 22, 2000.

Tracking down Software Bugs Using Automatic Anomaly Detection by S. Hangal and M. S. Lam; http://suif.stanford.edu/papers/Diduce.pdf; In *Proceedings of the International Conference on Software Engineering*, pp. 291-301, May 2002.

* cited by examiner

BREAK AND OPTIONAL HOLD ON FAILURE

BACKGROUND

In developing software, it is typical that errors or "bugs" in the code will be discovered. Hopefully, the errors are discovered during software testing before the software is released to avoid user frustration or the need to create and apply patches, fixes, or corrected versions. Software testing may involve simulated user or multi-user interaction with the software being developed, during which a script of test data is applied to the software to simulate actual use and, hopefully, identify errors in the software.

In testing software, a test script including a number of simulated user instructions is applied to the software. At the conclusion of the test script, it is determined if an error occurred. The results of the test generally are recorded to inform the developers of the software whether the software includes any bugs. At the conclusion of the test, the computer or computing environment used to perform the test may be reallocated to run another test of the same software or to run a test on a different software program.

Unfortunately, when software fails during a test, even if the test script included relatively few instructions, once the complete test script has been executed, it may prove difficult to determine what were the circumstances or causes of the failure. Even knowing what type of failure occurred during execution of the test still may result in a great number of possible problems that may have to be investigated and addressed in order to resolve the failure.

The difficulty in resolving errors or bugs may be particularly acute in the case of intermittent failures. Intermittent failures, by definition, do not occur each time that a software program is run, each time it is tested, or even each time the same software program is subjected to the same test. Such failures may be caused by a series of events that sometimes cause processes within a computing environment to conflict or by a coincidence of events that sometimes occur in a computing environment that result in an occurrence of failure in another computing environment. Because it may be difficult to identify the circumstances that result in the occurrence of such an intermittent failure, it may be more difficult to resolve than a failure that occurs regularly.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The present disclosure is directed to computer-implemented methods, computer-readable media and a system for facilitating debugging of a software program by breaking, and optionally holding, execution of the software program when a failure occurs. Implementations of break and hold preserve a state of a computing environment on which the software program has failed. Thus, by being able to examine the state of the computing environment existing upon the occurrence of the failure, including the condition of various processes and values, it may be easier to resolve the error or errors that resulted in the failure.

In one implementation, upon occurrence of a failure during the execution of a first software program in a first computing environment, execution of the first software program breaks. A first state of the first computing environment existing upon the breaking of the execution of the first software program is then held. A failure notification is generated to signal the failure to a monitoring system. The monitoring system accesses hold information to determine whether the first computing environment should hold its current state and whether one or more other computing environments interacting with the first computing environment should also hold their states.

Breaking of the execution and holding the state may occur during the performance of a test of the first software program. A test client may be operated in the first computing environment, in which the test client causes the break in execution, the holding of the state, and the generation of the failure notification. In one implementation, the test client is configured to cause the breaking of the execution of the first software program following execution of a test instruction resulting in the occurrence of the failure and prior to executing a next test instruction. In one implementation, a test support system is in communication with the test client. The test client may engage the test support system to perform the test of the first software program.

The holding of the state may continue until the monitoring system directs the test client to continue holding the state, discontinue holding the state, or after the end of a time interval. The monitoring system may direct the test client to continue the holding of the first state based upon failure data accessible to the monitoring system. The failure data may include submission data included in initiating the execution of the first software program indicating that the execution of the first software program is to be held upon occurrence of a first failure. Alternatively the failure data may include failure tag data that indicates the execution of the first software program is to be held upon occurrence of a selected failure type represented by the failure in the execution of the first software program.

A second software program executing in a second computing environment that interacts with the first software program also may be held. The monitoring system initiates a break in the execution of the second software program, and causes a second state of the second software program existing at the time of the break to be held. Software programs that interact may include, for example, a client application interacting with a server application, or multiple client applications that interact with a common server.

In another implementation, upon the break and hold in execution, execution of the first software program may be terminated, and the computing environment will log information about the existing state.

These and other features and advantages will be apparent from reading the following detailed description and reviewing the associated drawings. It is to be understood that both the foregoing general description and the following detailed description are explanatory only and are not restrictive. Among other things, the various embodiments described herein may be embodied as methods, devices, or a combination thereof. Likewise, the various embodiments may take the form of an entirely hardware embodiment, an entirely software embodiment or an embodiment combining software and hardware aspects. The disclosure herein is, therefore, not to be taken in a limiting sense.

BRIEF DESCRIPTION OF THE DRAWINGS

In the drawings, like numerals represent like elements. The first digit in the reference numerals refers to the figure in which the referenced element first appears.

DETAILED DESCRIPTION OF IMPLEMENTATIONS

This detailed description describes implementations of breaking and optional holding on failure. Although implementations of breaking and holding would prove useful even in executing a software program in a single computing environment, examples referenced in the following discussion contemplate a testing environment in which a plurality of networked computing environments execute a plurality of tests of one or more software programs. As is understood by those skilled in the art, performing tests on a software program executing in a plurality of computing environments allows for the software program to be tested more thoroughly and efficiently.

Illustrative Operating Environment

Figure 1:
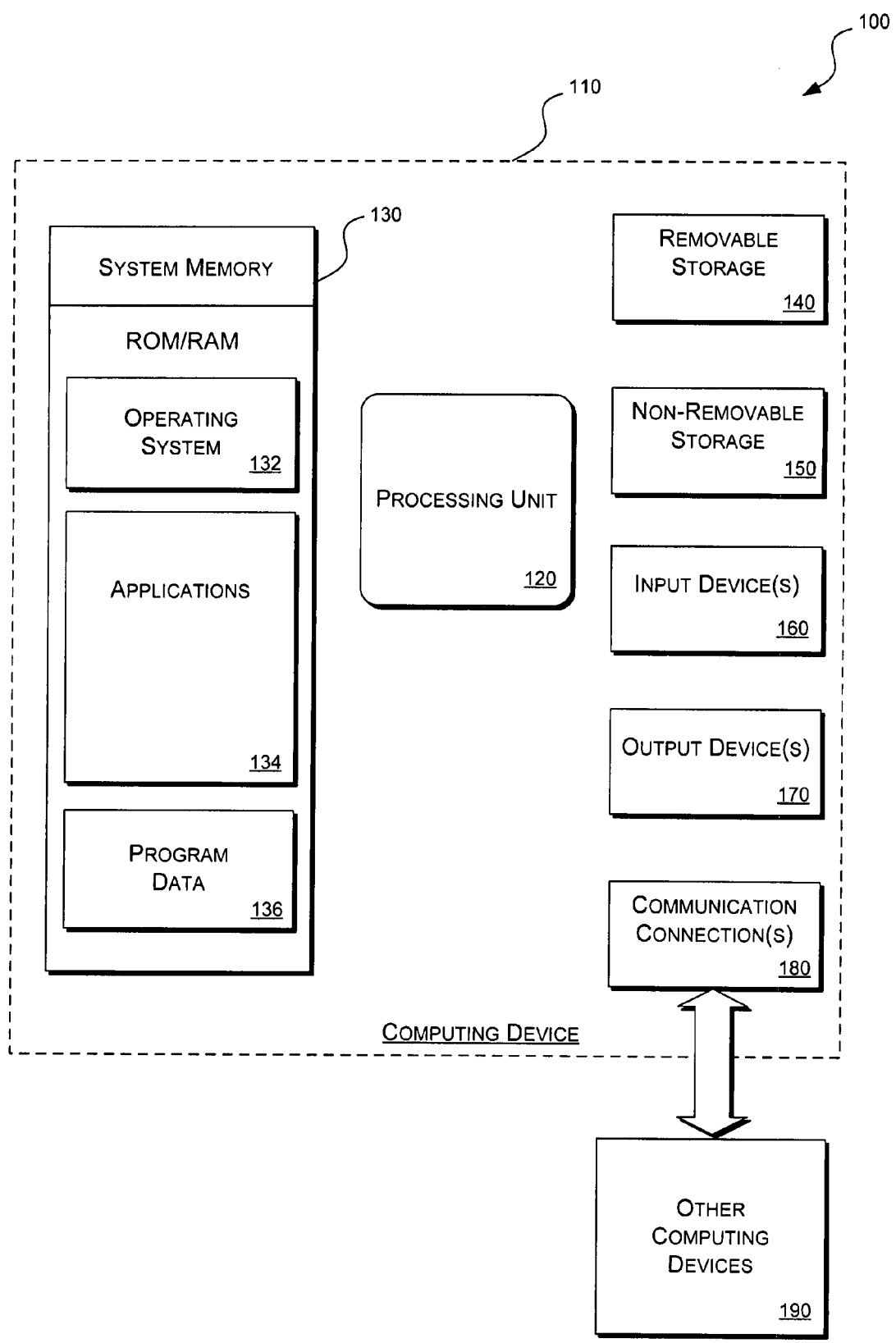
FIG. 1 is a block diagram of an operating environment for implementations of computer-implemented methods, computer-readable media, and systems as herein described.

Implementations of breaking and holding may be supported by a number of different computing environments on which software may be executed or tested. FIG. 1 is a block diagram of a representative operating environment 100.

Referring to FIG. 1, an exemplary operating environment 100 includes a computing device, such as computing device 110. In a basic configuration, the computing device 110 may include a stationary computing device or a mobile computing device. The computing device 110 typically includes at least one processing unit 120 and a system memory 130. Depending on the exact configuration and type of the computing device 110, the system memory 130 may be volatile (such as RAM), non-volatile (such as ROM, flash memory, and the like) or some combination of the two. The system memory 130 typically includes an operating system 132, one or more applications 134, and may include program data 136.

The computing device 110 may also have additional features or functionality. For example, the computing device 110 may also include additional data storage devices (removable and/or non-removable) such as, for example, magnetic disks, optical disks, or tape. Such additional storage is illustrated in FIG. 1 by removable storage 140 and non-removable storage 150. Computer storage media may include volatile and non-volatile, removable and non-removable media implemented in any method or technology for storage of information, such as computer readable instructions, data structures, program modules or other data. The system memory 130, the removable storage 140, and the non-removable storage 150 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computing device 110. Any such computer storage media may be part of the computing device 110. The computing device 110 may also include one or more input devices 160 such as a keyboard, mouse, pen, voice input device, touch input device, etc. One or more output device(s) 170 such as a display, speakers, printer, etc. may also be included.

The computing device 110 also includes one or more communication connections 180 that allow the device to communicate with other computing devices 190, such as over a network or a wireless network. The one or more communication connections 180 represent an example of communications media. Communications media typically embodies computer readable instructions, data structures, program modules or other data in a modulated data signal such as a carrier wave or other transport mechanism and includes any information delivery media. The term "modulated data signal" may include a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. The term computer readable media as used herein includes both storage media and communication media.

Exemplary Environment for Executing Software Programs Using Break and Hold

Figure 2:
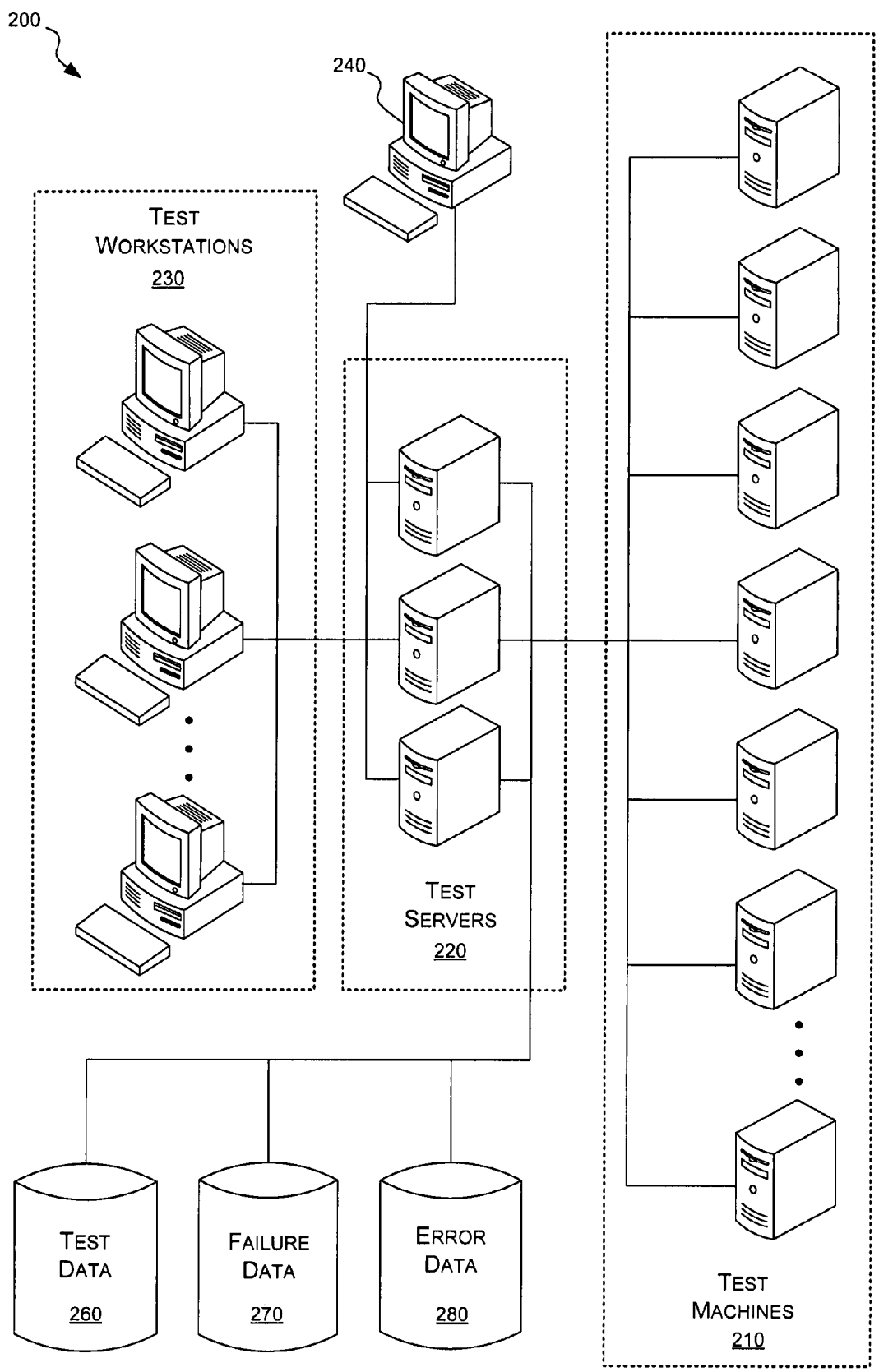
FIG. 2 is a network diagram of a testing environment including a plurality of computing environments to facilitate the testing of one or more software programs, as well as the administration and monitoring of the testing.

FIG. 2 illustrates a testing environment 200 configured to test one or more software programs. Implementations of break and hold are useful for such a testing environment to assist in the testing and debugging of software. On the other hand, implementations of break and hold also are useful in other contexts where it might be useful to preserve a state of a computing environment. For example, in a server farm or any other production environment, when a system experiences a failure, it may be useful in solving the problem and preventing future failures to be able to break execution of a failing system and hold the state attending the occurrence of the failure. Holding the state of the machine not only may facilitate debugging, but also, for example, may allow systems personnel to perform data restoration to preserve data integrity if a system should fail in the course of normal, production operation.

The testing environment 200 includes a plurality of test machines 210. Each of the test machines 210 includes a computing environment including at least a portion of the attributes and functionality of the computing environment 100 described with reference to FIG. 1. It will be appreciated by those skilled in the art that, in a testing environment, each of the plurality of test machines may not be equipped with, for example, input devices 160, output devices 170, or removable storage 140 because the input is supplied to each of the plurality of test machines 210 via a communication connection from the test servers 220. It should also be appreciated that, while a computing environment can be conceived as a single test machine or test computer executing a software program, a computing environment may include multiple physical computers executing cooperatively to serve as a computing environment. Alternatively, a single computing system or test machine may be able to support multiple operating environments or partitions, each of which is its own computing environment. Thus, while computing environments and test machines may be used interchangeably in this description, implementations of monitoring execution of software programs are not restricted to situations in which each computing environment includes a single computer or vice versa.

The test machines 210 are in communication with one or more test servers 220 that administer the operation of the software tests. For example, the test servers 220 identify which of the test machines 210 will run which tests, initiate the tests, and report the results. The test servers 220 are in communication with a plurality of test workstations 230 used by personnel who desire to test software programs. When a user of a test or workstation 230 submits a test, the test servers 220 prioritize, schedule, and prepare the tests for execution. The test servers 220 also are in communication with an administrator workstation 240 that allows for control and management of the test servers 220 as well as the test machines 210 and the test workstations 230.

The test servers 220 and data stores 260-280 also may serve as a monitoring system for overseeing the testing executed on the plurality of test machines. Operation of the monitoring system and its interaction with the test machines is described in U.S. patent application Ser. No. 11/700,992 for "TRACKING DOWN ELUSIVE INTERMITTENT FAILURES," filed on Jan. 31, 2007, the disclosure of which is incorporated in this application by reference.

The test servers 220 and, in turn, the test machines 210, are in communication with a plurality of data stores including test data 260, failure data 270, and error data 280. The test data 260 includes, for example, test scripts including the instructions used to provide input or commands to test the software being tested. The failure data 270 specifies programs or failure types the testing personnel wish to investigate, as is described further below. The error data 280 is a repository for storing information about failing programs and failures that occur, such as logs written by failing machines.

Implementation of a Test Client within a Test Machine

Figure 3:
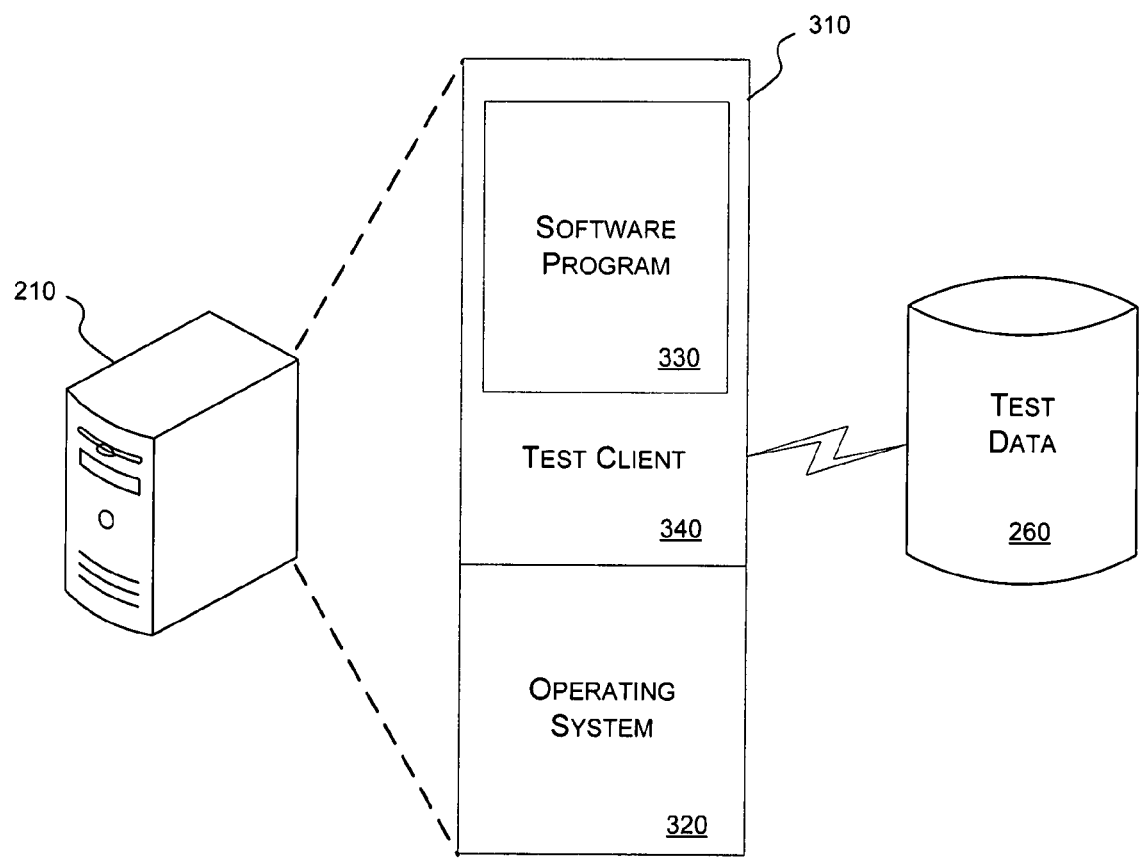
FIG. 3 is a block diagram of an implementation of a test client executing on a computing environment used in a test to facilitate implementations of breaking and holding.

In one implementation of a testing environment 200 (FIG. 2), each of the computing environments represented by one of the test machines 210 operates a test client program as illustrated in FIG. 3. FIG. 3 illustrates one exemplary test machine 210 and software layers 310 supported by the test machine 210. The software layers 310 include an operating system 320 that, as is widely understood, controls the operation of the hardware and the software of the test machine 210. A software program 330, such as an application or other software program being tested, executes under the control of the operating system 320.

In one implementation, the software layers 310 also include a test client 340. The test client 340 is, in effect, a software harness executing under the control of the operating system 320. The software program 330 executes within the control of the test client 340. The use of the test client 340 provides at least two advantageous features. First, the test client 340 engages test scripts stored in the test data 260 and applies the simulated input included in the test scripts to the software program 330. Thus, the test client 340 in combination with the test data 260 (via the test servers 220) controls the execution of the tests performed on the software program 330.

Second, because the software program 330 executes within the control of the test client 340, should a failure occur during the execution of the software program 330, the test client can break the execution of a software program 330 when a failure occurs. Thus, the test client 340 can preserve the state of the computing environment existing on the test machine 210 attending the occurrence of the failure. While preserving that state, the test client 340 can communicate with other systems within the testing environment 200 (FIG. 2) to notify other systems of the occurrence of the failure.

One skilled in the art will appreciate that, typically, once a test script is applied in testing a software program, the full test script is executed on the software program and any failure that occurs is reported at the conclusion of the test script's execution. As a result, the state of the computing environment at the point when the failure occurred, including the status of any processes, pointer and register values, and other conditions, may be changed as a result of instructions applied by the test script after the occurrence of the failure. By being able to hold the state of the computing environment upon the occurrence of the failure without executing further instructions in the test script, testing personnel may be able to more readily identify the causes of the failure.

Modes of Break and Optional Hold

Figure 4:
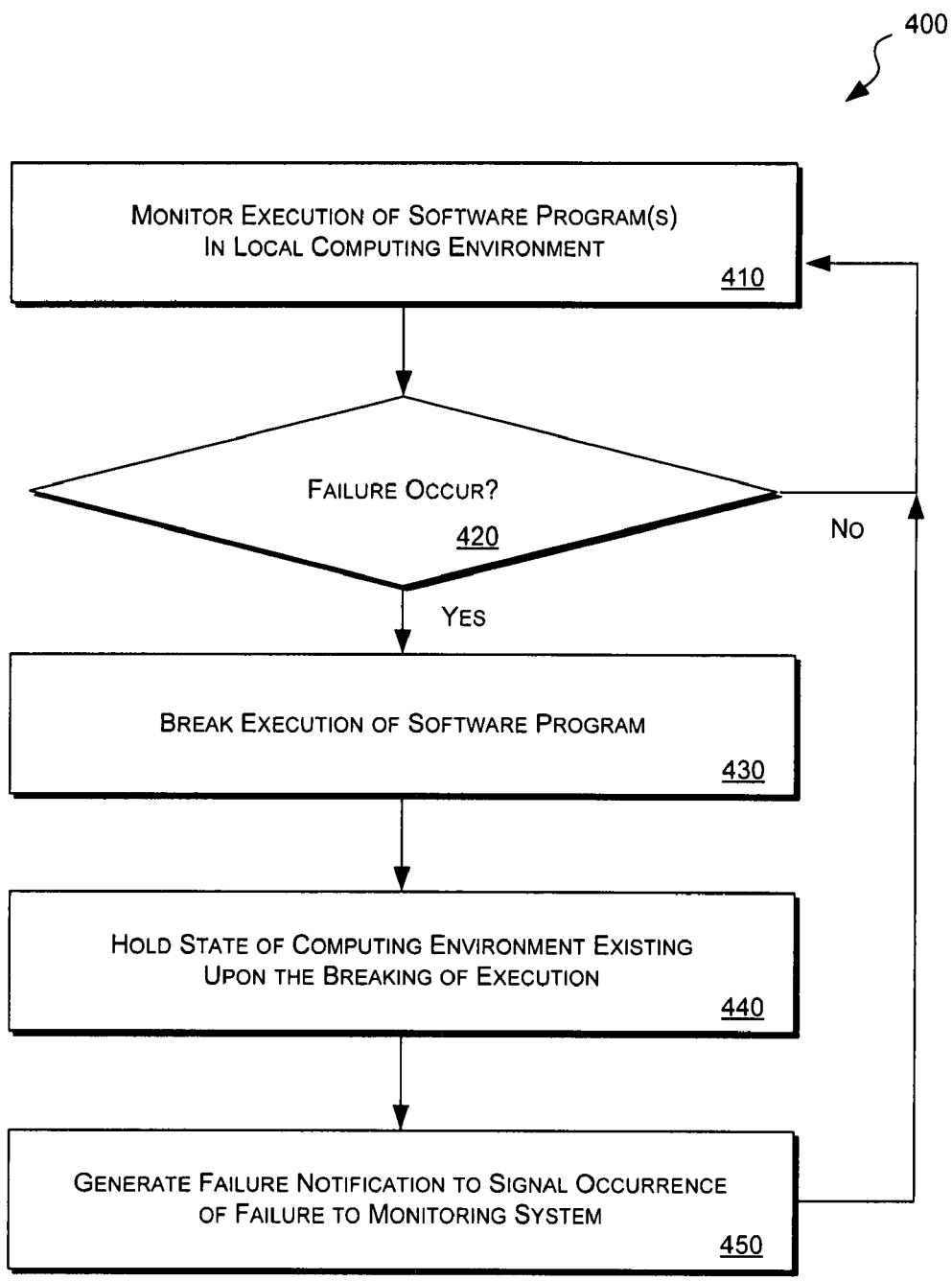
FIGS. 4 and 5 are flow diagrams of breaking of execution of a software program and holding of the state of a computing environment upon the occurrence of a failure.

FIG. 4 presents a flow diagram 400 of an implementation of breaking execution and holding a state of a software program. At 410, execution of a software program in a local computing environment, such as a test machine, is monitored. More than one software program may be executing in the local computing environment, or the software program may be executing on a plurality of test machines. As also previously described, in one implementation, test data is used to apply a test script to the software program and monitor the response of the software program for the possible occurrence of the failure.

At 420, it is determined if a failure has occurred during the execution of the test. If not, the flow diagram 400 loops to 410 to continue monitoring the execution of the software program. On the other hand, if it is determined that a failure has occurred, at 430, execution of the software program breaks. At 440, the state of the computing environment existing upon the breaking of execution is held. As is described further below, the state existing upon the occurrence of the failure can be held for a predetermined period of time or until the local computing environment receives instructions to continue holding the state or to resume execution.

At 450, a failure notification is generated to signal the occurrence of the failure to a monitoring system. For example, in the testing environment 200 of FIG. 2, the monitoring system may include the test servers 220. The test servers 220 process the failure notification to determine whether the state of the computing environment on which the failure occurred should continue to be held and/or whether any testing personnel should be notified of the occurrence of the failure, as is explained further below. If the monitoring system determines that the state of the computing environment should not be held, the monitoring system instructs the computing environment to resume execution of its test. If the test resumed, the local computing environment will proceed to the next instruction in the test script.

Figure 5:
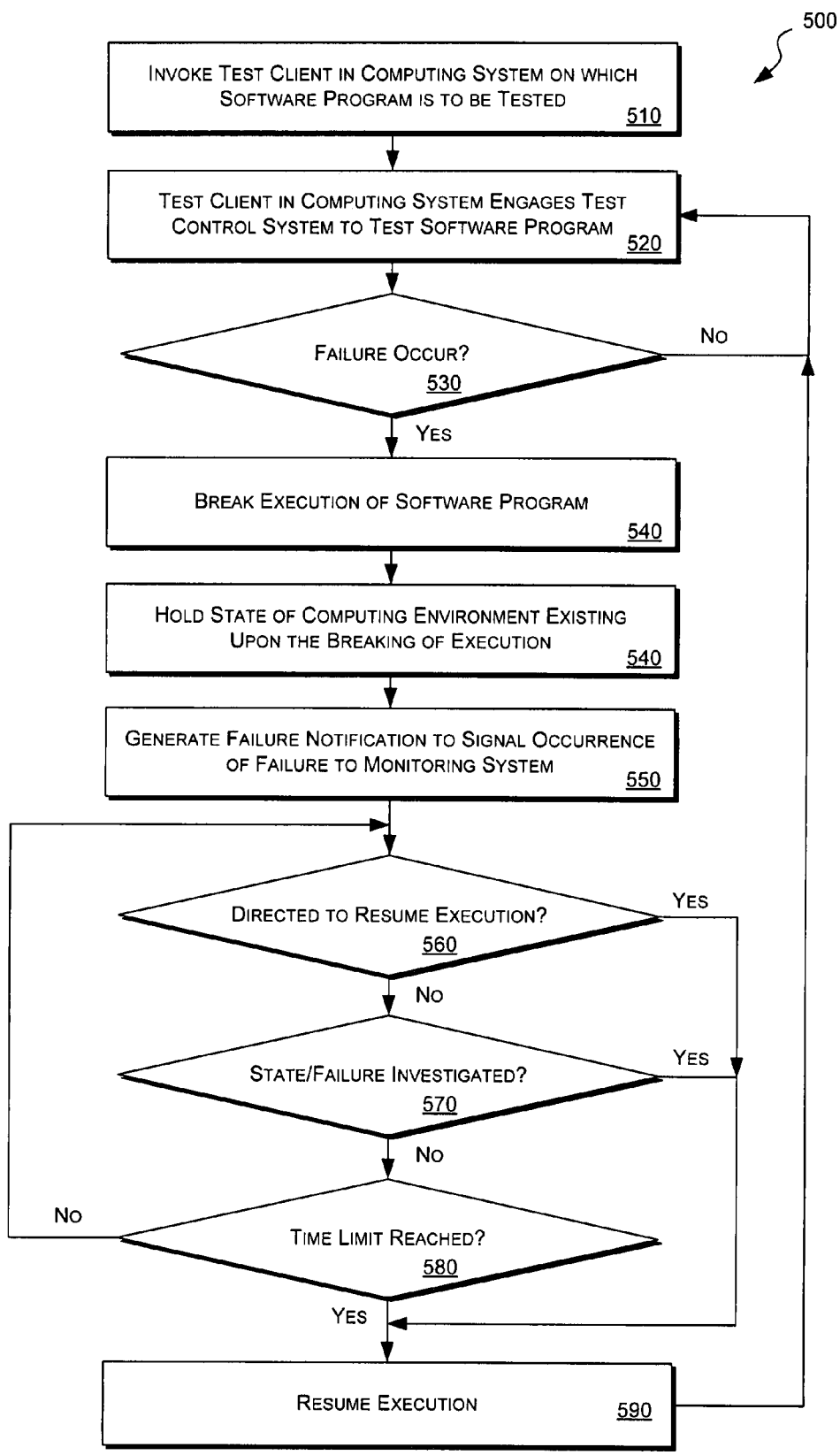

FIG. 5 presents a flow diagram 500 depicting a process of using break and optional hold through the use of a test client program operating in the computing environment on which the software program is being tested. The flow diagram 500 also depicts in more detail the interaction of a computing environment using break and hold in connection with a monitoring system.

At 510, the test client is invoked on the computing system on which the software program is being tested. At 520, the test client engages a test control system to test the software program. In the testing environment 200 of FIG. 2, for example, the test control system may include the test servers 220, which administer the tests, and the test data 260, which includes the test scripts applied to the software program on one or more test machines 210.

At 530, it is determined if a failure has occurred. If it is determined that no failure has occurred, the flow diagram 500 loops to 520 to continue to monitor for the occurrence of a failure. On the other hand, if it is determined at 530 that a failure has occurred, at 540, execution of the software program breaks. At 540, execution of the computing environment existing at the point of breaking is held. As previously described, a suitable test client is configured to control the execution of the software program so that the test client can preserve the states of processes operating in the computing environment upon the occurrence of a failure.

At 550, a failure notification is generated to signal the occurrence of the failure. With reference to the testing environment 200 of FIG. 2, for example, the failure notification may include a message sent from one of the test machines 210 to one or more of the test servers 220 to signal that a failure has occurred. Alternatively, generating a failure notification may include the setting of a status flag or other indicator that will be detected, for example, by the test servers 220 while polling the test machines 210.

In the implementation described in FIG. 5, the computing environment or test machine experiencing the occurrence of failure follows one exemplary process before ending its hold state and resuming execution of the software program. After holding the state of the computing environment 540 and generating the failure notification at 550, at 560, it is determined if the computing environment has been directed to resume execution and testing of the software program. An exemplary process by which a monitoring system may determine whether to direct the computing environment to resume execution is described below with reference to FIG. 6.

If a monitoring system determines that the computing environment for which a failure notification was generated at 550 should not be held, in one implementation the monitoring system directs the computing environment to resume execution of the software program. At 560, if it is determined that the computing environment has been directed to resume execution, at 590, the computing environment resumes execution.

If it is determined at 560 that the computing environment is not directed to resume execution, at 570, it is determined whether the state of the computing environment and the cause of the failure have already been investigated. In one implementation, the computing environment experiencing the failure may be held at the point of failure until the failure has been investigated, and then will continue execution. If it is determined that the state of the computing system and the cause of the failure have been investigated, at 590, execution of the software program resumes on the computing environment.

If it is determined at 570 that the state of the computing environment has not yet been investigated, at 580, it is determined whether a time limit for holding execution of the computing environment has been reached. In one implementation, once a computing environment is held upon the occurrence of failure, the computing environment will hold that state for a predetermined period unless otherwise instructed to continue to hold its state or to resume execution. By imposing a time limit, personnel potentially interested in investigating the occurrence of failure are given time to study the failure but, if they do not act within the allotted time, the computing environment will resume execution so as not to unnecessarily tie up the computing environment and keep it from being used for other purposes.

If it is determined at 580 that the time limit has not been reached, the flow diagram 500 loops to 560 to determine if the computing system has been directed to resume execution then to 570 to determine if the failure already has been investigated. In this manner, the flow diagram 500 continues to loop until the time limit is reached or the computing environment is directed to resume execution, whichever comes first. If it is determined at 580 that the time limit has been reached, at 590, execution resumes. After the computing environment resumes execution at 590, the flow diagram 500 loops to 520 to continue the test of the software program.

In the implementation described in FIG. 5, the computing environment will resume execution of the software program at 590. However, the execution of the test on the software program may not be continued. For example, while the computing environment has been held, an updated build of the software program may have been created and submitted for testing, thereby mooting the tests run on the implementation during which the computing environment had been held. In other implementations, after a failure has been experienced in the computing environment has been held for some period of time, the test on the software program may be aborted, with information about the state of the computing environment being logged for later study. The information, for example, may be logged in the error data 280. Accordingly, the break and optional hold on failure process described in FIG. 5 may be adapted to allow for different responses when failures occur.

Figure 6:
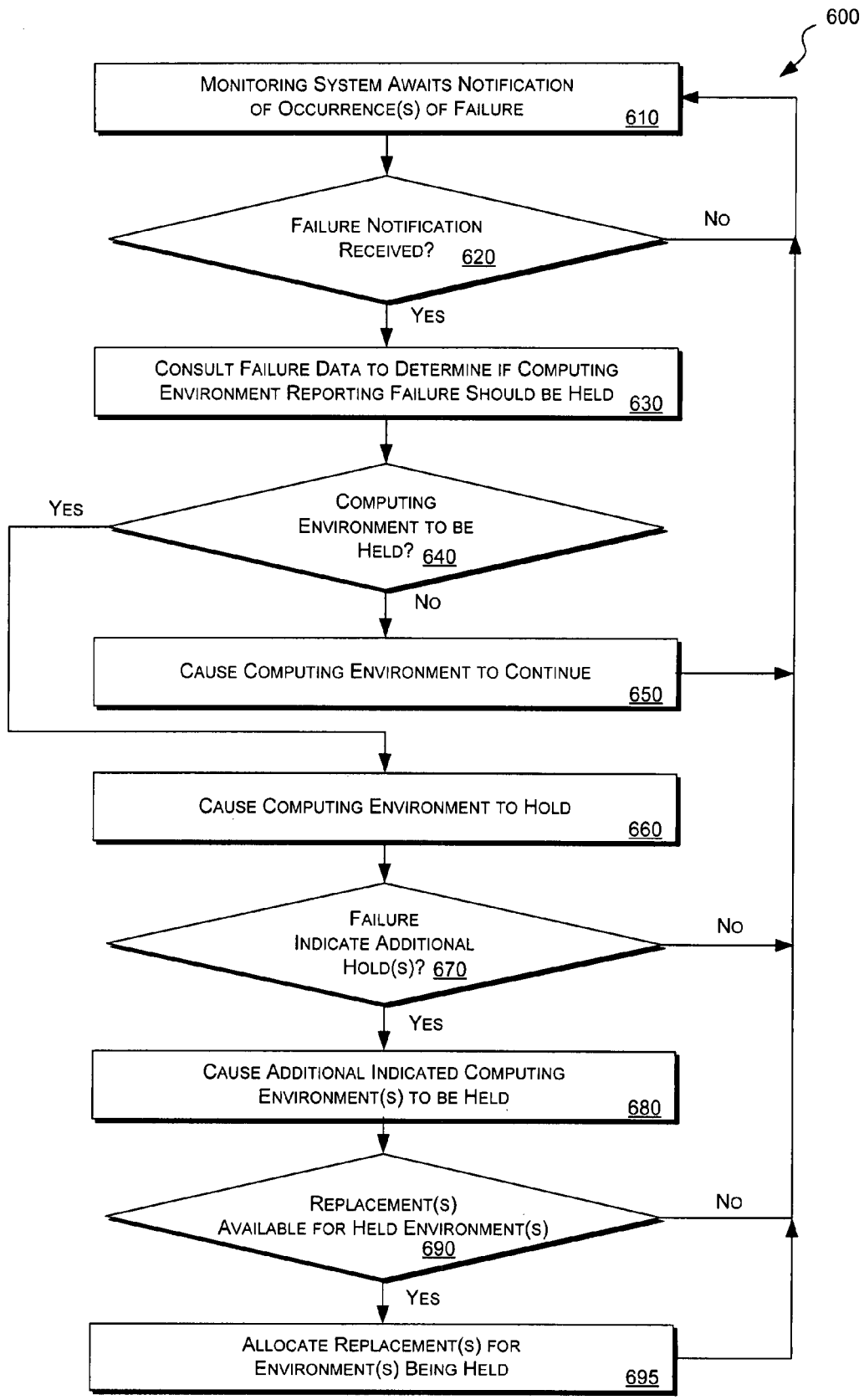
FIG. 6 is a flow diagram of a process by which a monitoring system responds to a notification of a failure from a computing environment being monitored.

As previously described with reference to FIG. 5, a monitoring system in communication with the one or more computing environments on which the software program is executing receives notifications of occurrences of failures from the computing environments. The monitoring system is configured to direct a failing computing environment to resume execution or to hold its current state. The flow diagram 600 of FIG. 6 illustrates one implementation of a mode of operation of the monitoring system in directing computing environments when to hold their states.

At 610, the monitoring system waits to receive notification of the occurrence of a failure in one of the computing environments it monitors. At 620, it is determined whether a failure notification has been received. If not, the flow diagram 600 loops to 610 where the monitoring system continues to wait for notification of the occurrence of a failure. On the other hand, if it is determined at 620 that a failure notification has been received, at 630, failure data is consulted to determine if the computing environment reporting the failure should be held at its current state.

The failure data 270 (FIG. 2) may include test submission information specifying when occurrences of failure for a particular software program being tested should be held. For example, upon submitting a selected version of the software program for testing, the test submission information may indicate that only the test machine that first experiences an occurrence of failure should be held for further investigation. Alternatively, the submission information may specify that no machines be held and, instead, that the state of the test machine be logged in the error data 280 for later investigation. Further alternatively, the submission information may specify that a selected number of machines experiencing failures should be held.

The failure data 270 also may include failure tag information that identifies a type of failure that testing personnel wish to investigate. For one example, a certain type of intermittent failure resulting in a particular failure type may occur frequently enough that resolving the failure becomes a priority. Thus, the failure data 270 may specify that, when a test machine 210 executing a software program reports the failure type of interest, that failing machine will be held for further investigation. Again, alternatively, the failure data 270 may specify that machines experiencing the selected failure not be held but instead instruct that the state of the test machine be stored in the error data 280 for later investigation. Also, the failure tag data may specify that a selected number of test machines on which an error of the identified failure type be held for subsequent investigation.

Once the failure data is consulted at 630, at 640, it is determined if the computing environment is to be held. If not, at 650, the computing environment will be directed or caused to continue its execution. Causing the computing environment to continue execution may be implemented in a number of ways. For example, as previously described with reference to FIG. 5, the monitoring system may generate an instruction to the computing environment directing it to continue execution. On the other hand, the computing environments supporting the tests may be configured to only hold the state of the computing environment if an instruction is received from the monitoring system directing the computing environment to continue to hold. In either such case, if it is determined at 640 that the computing environment is not to be held, the computing environment is caused to continue execution at 650 and the flow diagram 600 loops to 610 to wait notification of an occurrence of a failure.

On the other hand, if it is determined at 640 that the computing environment is to be held, at 660, the monitoring system causes the computing environment to hold its current state. Again, the monitoring system can cause the computing environment to hold a number of ways. For one example, the monitoring system may generate an instruction to the computing environment that instructs the computing environment to continue holding its state. On the other hand, the computing environment may be configured to continue to hold its state, indefinitely or for a predetermined interval as described with reference to FIG. 5.

After causing the computing environment to hold at 660, at 670, it is determined if the failure indicates that one or more additional computing environments should also be held. For example, the software program being tested on the computing environment may be an e-mail client program that interacts with an e-mail server program executing in another computing environment or with other e-mail clients executing in still other computing environments. Because the failure occurring may result from the interaction with these other systems, and the failure may actually lie with one or more of those other systems, it may be appropriate to hold those other computing environments as well as the computing environment for which the occurrence of failure was reported. Whether holding other computing environments is appropriate in which of those environments should be held may be described in the failure data 270 (FIG. 2) in job submission data, failure tag data or some other information which also may provide information as to what other computing environments are operating software programs that interact with the software program that has failed.

If it is determined at 670 that no additional computing environments are to be held, the flow diagram 600 loops to 610 to await notification of occurrence of another failure. However, if it is determined at 670 that one or more additional holds are appropriate, at 680, the monitoring system causes the additional indicated computing environments to also be held. The additional computing environments can be caused to hold in a number of ways. For one example, if those other computing environments support a test client program as previously described, a hold message sent from the monitoring system will cause the test client to hold its current state at the point of receiving the hold message. Alternatively, when a number of software programs interact with one another, as each of these software programs executes, it may check a status of a flag, recurring message, or other indicator maintained by the monitoring system indicating that each should continue execution. In such an environment, when an indication to continue is not communicated, each of the computing environments executing the interacting software programs may be configured hold their execution until they instructed to continue.

When one or more computing environments are held for investigation, the held computing environment or environments are not available to continue the testing or the work for which the held environments were allocated. At 690, it is determined whether one or more replacement computing environments are available to replace the held computing environment or environments. Whether replacement computing environments are available to be allocated to replace the held computing environments may be a factor of whether there are unused computing environments to be allocated as replacements and/or whether the testing or work that was being performed by the held computing environments is of sufficient priority to merit allocation of replacement computing environments. Information about whether available computing environments should be allocated may be maintained in the failure data 270 (FIG. 2) or other information used in monitoring and/or managing the allocation of work within the system.

If it is determined that replacement environments are not to be allocated, the flow diagram 600 loops to 610 to wait for notification of an occurrence of failure. However, if it is determined that replacement computing environments are to be allocated, at 695, one or more replacement computing environments is allocated to replace the computing environments being held.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A computer-implemented method for preserving a state of a first computing environment supporting execution of a first software program, comprising:

upon occurrence of a failure during the execution of the first software program, breaking execution of the first software program and breaking execution of a second software program that is interacting with the first software program;

holding a first state of the first computing environment existing upon the breaking of execution of the first software program; and generating a failure notification to signal the failure to a monitoring system.

2. The method of claim 1, wherein the execution of the first software program includes performing at least one test of the first software program.

3. The method of claim 2, further comprising operating a test client within the first computing environment, the test client being configured to cause:

the breaking of the execution of the first software program upon the occurrence of the failure;

the holding of the first state of the first computing environment; and the generating of the failure notification.

4. The method of claim 3, wherein the test client is configured to cause the breaking of execution of the first software program following execution of a test instruction preceding the occurrence of the failure and prior to executing a next test instruction.

5. The method of claim 3, further comprising a test support system in communication with the test client, wherein the test client engages the test support system to perform the at least one test of the first software program.

6. The method of claim 3, further comprising continuing the holding of the current state until the monitoring system directs the test client to one of:
   continue the holding of the first state; and
   discontinue the holding of the first state and resume the execution of the first software program.

7. The method of claim 6, wherein the monitoring system directs the test client to continue the holding of the first state based upon failure data accessible to the monitoring system, the failure data including at least one of:
   submission data included in initiating the execution of the first software program indicating that the execution of the first software program is to be held upon occurrence of a first failure; and
   failure tag data indicating the execution of the first software program is to be held upon occurrence of a selected failure type represented by the failure in the execution of the first software program.

8. The method of claim 7, wherein a second software program executing in a second computing environment interacts with the first software program, further comprising:
   the monitoring system initiating a breaking of the execution of the second software program; and
   holding a second state of the second computing environment existing upon the breaking of the execution of the second software program.

9. The method of claim 8, wherein:
   the first software program includes a client application and the second software program includes a server application that serves the client application;
   the first software program includes the server application and the second software program includes the client application that is served by the server application; and
   the first software program and the second software program each include an instance of the client application.

10. The method of claim 1, further comprising terminating the execution of the first software program and logging information about the first state.

11. The computer-implemented method of claim 1, further comprising at least one of:
   holding the state of the computing environment until a time limit is reached;
   holding the state of the computing environment upon receiving a hold instruction responding to the failure notification to hold the state of the computing environment;
   holding the state of the computing environment unless instructed to resume execution of the software program; and
   resuming execution of the software program upon receiving a continue instruction responding to the failure notification.

12. A system, comprising:
   a monitoring system;
   a computing environment in communication with the monitoring system and configured to execute:
   a first software program being tested by a plurality of test instructions; and
   a test client program configured, upon occurrence of a failure during execution of the first software program, to:
      break execution of the first software program;
   signal a failure type describing the failure to the test monitoring system; and
   hold a first state of the first computing environment existing upon the break in the execution of the first software program; and
   a second computing environment executing a second test client, wherein the second computing environment is in communication with the monitoring system and the first computing environment executing a second software program that interacts with the first software program, wherein:
      upon receiving the signal describing the failure during the execution of the first software program, the monitoring system is configured to cause the second test client to break execution of the second software program; and
      the second test client breaks execution of the second software program.

13. The method of claim 12, wherein the test client is further configured to cause the breaking of execution of the first software program following execution of a last test instruction preceding the occurrence of the failure and prior to executing a next test instruction.

14. The system of claim 12, wherein the test client program is further configured to continue holding the first state of the first computing environment until the monitoring system directs the test client to one of:
   continue the holding of the first state; and
   discontinue the holding of the first state and resume the execution of the first software program.

15. The system of claim 12, further comprising a failure tagging system accessible to the monitoring system, wherein the failure tagging system is configured to:
   maintain failure tag data identifying at least one identified failure type potentially occurring during the execution of the first software program; and
   process requests from the monitoring system to determine if the occurrence of failure manifested the identified failure type.

16. The system of claim 12, wherein the monitoring system is further configured to cause the test client to continue holding the first state when the failure includes the identified failure type.

17. The system of claim 12, wherein the monitoring system is further configured to cause the test client to continue holding the first state when submission data included in initiating the execution of the first software program indicates that the execution of the first software program is to be held upon occurrence of at least one failure.

18. The method of claim 12, wherein:
   the first software program includes a client application and the second software program includes a server application that services the client application;
   the first software program includes the server application and the second software program includes the client application that is serviced by the sewer application; and
   the first software program and the second software program each include an instance of the client application.

19. A computer-readable medium having stored thereon computer-executable instructions, comprising:

monitoring execution of a software program being tested in a computing environment in response to a plurality of test instructions;

breaking execution of the software program upon occurrence of a failure in the execution of the software program prior to applying a next text instruction;

holding a state of the computing environment existing upon the breaking of the execution of the software program;

holding a second state of a second computing environment existing upon the break in the execution of a second software program that is interacting with the software program; and generating a failure notification indicating the failure has occurred.

* * * * *

UNITED STATES PATENT AND TRADEMARK OFFICE
CERTIFICATE OF CORRECTION

| | | |
|---|---|---|
| PATENT NO. | : 7,673,178 B2 | Page 1 of 1 |
| APPLICATION NO. | : 11/701122 | |
| DATED | : March 2, 2010 | |
| INVENTOR(S) | : Loren Merriman et al. | |

It is certified that error appears in the above-identified patent and that said Letters Patent is hereby corrected as shown below:

In column 12, line 63, in Claim 18, delete "sewer" and insert -- server --, therefor.

Signed and Sealed this
Seventeenth Day of May, 2011

David J. Kappos
*Director of the United States Patent and Trademark Office*